United States Patent
Schexnayder

Patent Number: 5,421,545
Date of Patent: Jun. 6, 1995

[54] POPPET VALVE WITH FORCE FEEDBACK CONTROL

[75] Inventor: Lawrence F. Schexnayder, Joliet, Ill.

[73] Assignee: Caterpillar Inc., Peoria, Ill.

[21] Appl. No.: 115,620

[22] Filed: Sep. 3, 1993

[51] Int. Cl.6 .............................................. F16K 31/12
[52] U.S. Cl. .................................. 251/30.02; 137/487.5; 137/489.5
[58] Field of Search ............... 251/30.01, 30.02, 30.05, 251/26, 44; 137/489.5, 492.5, 487.5

[56] References Cited

U.S. PATENT DOCUMENTS

| | | | |
|---|---|---|---|
| 2,755,058 | 7/1956 | Margrave | 251/26 X |
| 4,585,206 | 4/1986 | Itoh | 251/30.02 |
| 4,848,721 | 7/1989 | Chudakov | 251/30.02 |
| 5,137,254 | 8/1992 | Aardema | 251/35 |
| 5,144,983 | 9/1992 | Schwelm | 137/625.64 |

FOREIGN PATENT DOCUMENTS

| | | | |
|---|---|---|---|
| 3306317 | 8/1984 | Germany | 251/30.02 |
| 57-65475 | 4/1982 | Japan | 251/30.02 |
| 2065929 | 7/1981 | United Kingdom | 251/30.01 |
| 2103390 | 2/1983 | United Kingdom | 251/30.02 |

Primary Examiner—Stephen M. Hepperle
Assistant Examiner—Kevin L. Lee
Attorney, Agent, or Firm—John W. Grant

[57] ABSTRACT

A force feedback popper valve has a valve element for controlling fluid flow from an inlet port to an outlet port. A meter-in orifice communicates pressurized fluid from the inlet port to a control chamber above the valve element. A pilot valve provides a meter-out orifice between the control chamber and the outlet port to selectively reduce the pressure level in the control chamber in response to a control force applied to the pilot valve. A feedback spring is disposed in the control chamber between the valve element and the pilot valve so that displacement of the valve element is proportional to the control force exerted against the pilot valve.

4 Claims, 2 Drawing Sheets

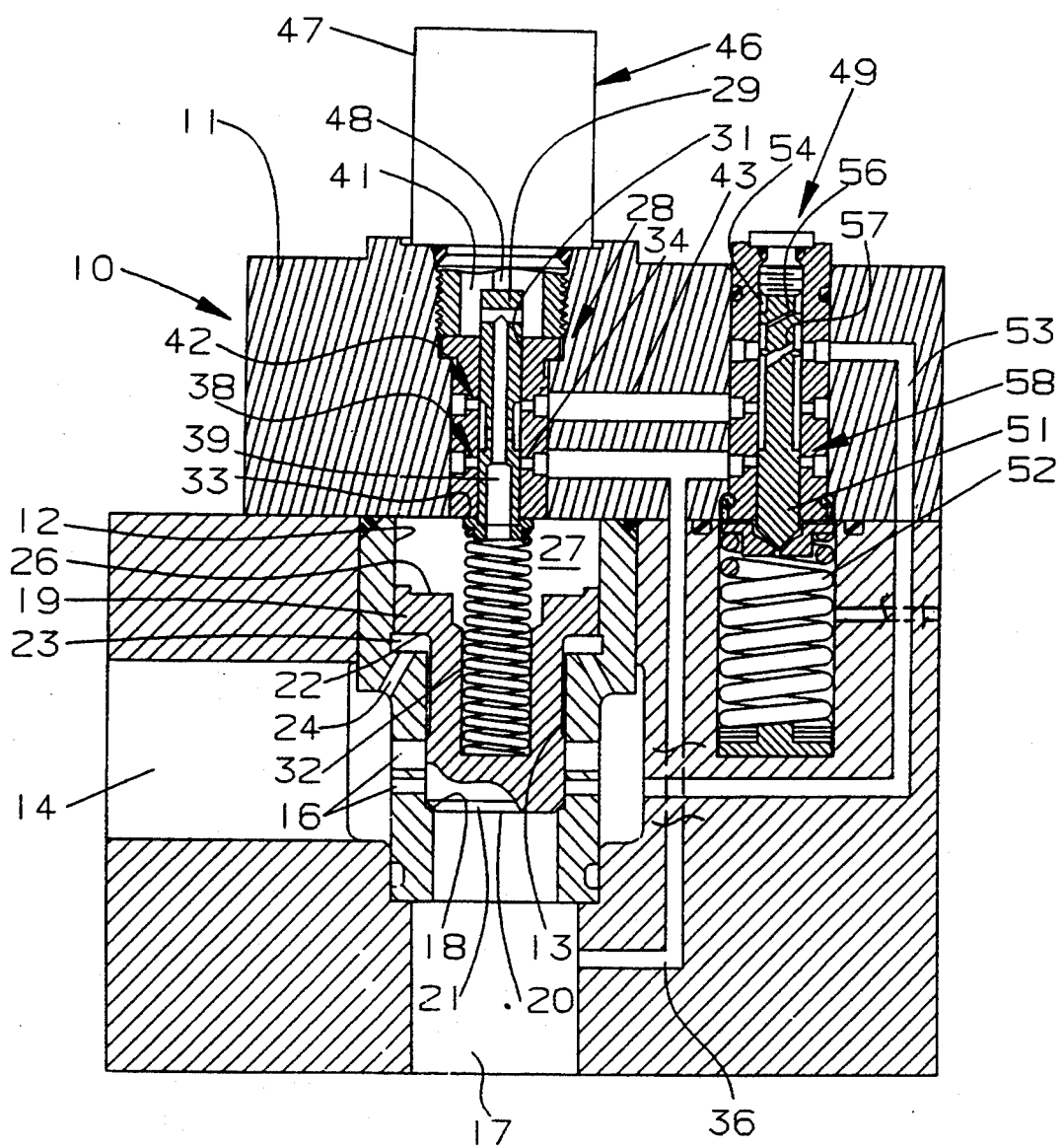
Fig_1_

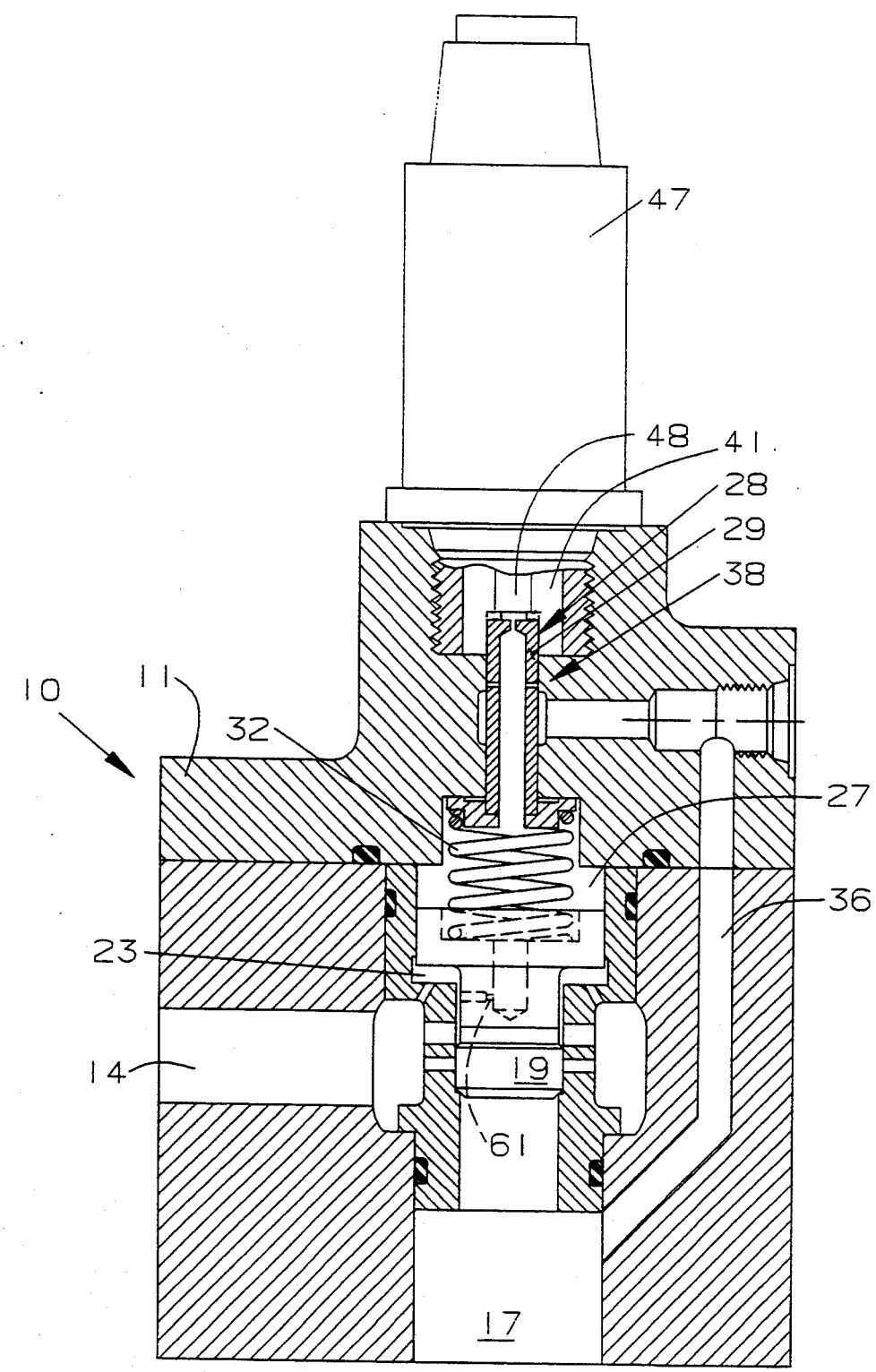
Fig_2_

POPPET VALVE WITH FORCE FEEDBACK CONTROL

TECHNICAL FIELD

This invention relates to a poppet valve and more particularly to a servo type poppet valve having a force feedback control.

BACKGROUND ART

Flow amplifying poppet valves commonly have a control chamber connected to an inlet port through an orifice and to the outlet port through a pilot passage. Opening of the poppet valve is controlled by controlling fluid flow through the pilot passage to create a pressure drop across the meter-in orifice to reduce the control pressure in the control chamber such that the inlet pressure urges the poppet off the valve seat when control pressure drops below the inlet pressure. The degree of opening of the popper is selectively controlled by regulating the flow through the pilot passage with a pilot valve.

One of the problems associated with the current popper valve designs is that because the degree of opening of the poppet fluctuates with changing flow forces acting on the poppet valve due to changing pressure conditions, there is no correlation between the degree of opening of the poppet and the degree of opening of the pilot valve.

Another problem is that the displacement of the poppet is dependant upon the volume of pilot flow through the pilot passage wherein increased opening of the poppet requires increased pilot flow. On larger poppet valves, the pilot flow becomes significant enough to impact on the pilot valve design. More particularly, if the pilot valve is controlled by a solenoid, a more powerful solenoid is required to move the pilot valve against the flow forces acting on the pilot valve.

The present invention is directed to overcoming one or more of the disadvantages or problems as set forth above.

DISCLOSURE OF THE INVENTION

In one aspect of the present invention, a force feedback poppet valve has inlet and outlet ports, a bore, a valve element slidably disposed in the bore between open and closed positions to control fluid flow between the inlet and outlet ports and having a first reaction surface and a second larger reaction surface, an actuation chamber defined in part by the first reaction surface and being in continuous communication with the inlet port, and a control chamber defined in part by the second reaction surface. A meter-in orifice is provided for restrictively communicating fluid from the inlet port to the control chamber. A pilot valve is disposed between the control chamber and the outlet port and includes a valve spool defining a variable meter-out orifice communicating the control chamber with the outlet port. The valve spool has a first position blocking fluid flow through the meter-out orifice and is movable from the first position in a first direction for establishing the variable meter-out orifice. A means is provided for selectively exerting a variable control force urging the valve spool in the first direction. A force feedback spring is positioned between the valve element and the valve spool to exert a feedback force against the valve spool in proportion to the displacement of the valve element.

The present invention provides an improved force feedback popper valve which utilizes the positive flow blocking capability of a poppet valve, the flow modulation of a spool valve and provides a more precise correlation of the displacement of the poppet valve relative to an input control force. More specifically, the input control force is exerted against a pilot valve spool controlling a pressure in a control chamber which contains a force feedback spring positioned between the pilot valve spool and the valve element to provide a mechanical feedback between the valve element and the pilot valve spool. The mechanical feedback provides a more precise control of the displacement of the valve element than can be obtained by controlling only the fluid pressure in the control chamber so that the poppet valve functions as a servo type poppet valve. Thus, the desired displacement of the poppet valve will be maintained regardless of changing flow forces or other type of external disturbances acting on the poppet valve.

BRIEF DESCRIPTION OF THE DRAWINGS

FIG. 1 is a cross-sectional view of an embodiment of the present invention; and

FIG. 2 is a sectional view of an alternate embodiment of the present invention.

BEST MODE FOR CARRYING OUT THE INVENTION

A force feedback poppet valve 10 includes a composite body 11 having a pair of concentric bores 12,13, an inlet port 14 in communication with the bore 13 through a plurality of flow modulating ports 16, an outlet port 17 in communication with the bore 13, and a valve seat 18 between the bore 13 and the outlet port 17. A stepped popper valve element 19 is slidably disposed in the bores 12,13 to control fluid flow through the modulating ports 16 between the inlet and outlet ports 14,17. The valve element 19 has an end surface 20 and a conical surface 21 sealingly engaging the valve seat 18 at a closed position of the valve element. An annular reaction surface 22 on the valve element cooperates with the body 11 to define an actuation chamber 23 in continuous communication with the inlet port 14 through a plurality of passages 24 so that the valve element is continuously urged in a valve opening direction by the pressurized fluid in the actuating chamber 23. Another reaction surface 26 on the valve element 19 cooperates with the body to define a control chamber 27.

A pilot valve 28 includes a pilot valve spool 29 slidably disposed in a bore 31 axially aligned with the bore 12. The spool 29 is resiliently urged to the position shown by a compression feedback spring 32 disposed in the control chamber 27 between the valve element 19 and an annular flange 33 suitably connected to the spool 29. A plurality of radial ports two of which are shown at 34 communicate the bore 31 with a passage 36 communicating with the outlet port 17. The spool 29 blocks communication through the ports 34 in the position shown. Movement of the spool 29 in a first direction toward the valve element 19, as hereinafter described, establishes a variable meter-out orifice 38 between the control chamber 27 and the outlet port 17. A passage 39 extending through the spool 29 communicates the control chamber 27 with a pressure balance chamber 41. The spool 29 also provides a variable meter-in orifice 42 between a passage 43 and the control chamber 27. The size of the meter-in orifice 42 decreases and the size of the meter-out orifice 38 increases when the spool 29 moves in the first direction. The meter-in orifice 42 and meter-out orifice 38 of this embodiment are commonly referred to as an underlap design in that the meter-out orifice opens slightly before the meter-in orifice closes. Alternatively, the spool 29 could be provided with either a line-to-line design wherein the meter-out orifice opens at the instant the meter-in orifice closes or an overlap design wherein the meter-in orifice closes slightly before the meter-out orifice opens.

A means 46 is provided for selectively exerting a variable control force urging the pilot valve spool 29 in the first direction. The force exerting means 46 includes a proportional solenoid 47 suitably removably fastened to the body 11 and having a movable stem 48 engaging the spool 29.

A relief valve 49 is disposed between the pilot valve 28 and the inlet and outlet ports 14,17 and includes a valve spool 51 resiliently urged to the position shown by a compression spring 52. The valve spool 51 at that position establishes communication between a passage 53 connected to the inlet port 14 and the passage 43 while blocking communication between the passage 53 and the passage 36. The passage 53 is in continuous communication with a control chamber 54 through a dampening orifice 56. Downward movement of the valve spool 51 sequentially blocks communication between the passages 53 and 43, provides restricted communication between passages 53 and 43 through an orifice 57 and subsequently establishes a variable orifice 58 between the passages 36 and 43.

Alternatively, the relief valve function may not be needed in some uses of the force feedback poppet and thus the relief valve 49 can be omitted with the passage 53 being connected directly to the passage 43.

An alternate embodiment of the force feedback poppet valve 10 of the present invention is disclosed in FIG. 2. It is noted that the same reference numerals of the first embodiment are used to designate similarly constructed counterpart elements of this embodiment. In this embodiment, however, the relief valve 49 has been eliminated and the pilot valve 29 modified to eliminate the variable meter-in orifice. A fixed size meter-in orifice 61 in the valve element 19 continuously communicates the inlet port 14 with the control chamber 27. The size of the fixed size orifice 61 is less than the maximum size of the meter-out orifice 38 established by downward movement of the spool 29. Alternatively, the fixed size orifice 61 can be formed within the valve body 11.

INDUSTRIAL APPLICABILITY

The normal use of the force feedback poppet valve 10 is to modulatably control fluid flow from the inlet port 14 to the outlet port 17. One example of such usage is having the inlet port 14 connected to a pump with the outlet port 17 connected to a hydraulic motor for controlling the flow of pressurized fluid to the hydraulic motor. Another example would be to have the inlet port 14 connected to a hydraulic motor and the outlet port 17 connected to a tank for controlling flow of pressurized fluid from the motor to the tank. In both cases, the valve element 19 is continuously urged in a valve opening direction toward the pilot valve 28 by the pressurized fluid in the actuation chamber 23 acting on the reaction surface 22 and the fluid in the outlet port acting on the end surface 20. However, with the pilot valve spool 29 in the position shown, pressurized fluid is directed through the meter-in orifice 42 to the control chamber 27 to generate a valve closing force which is combined with the force of the feedback spring 32 to overcome the combined valve opening force acting on the surface 20 and 22 to forcibly urge the conical surface 21 into seating engagement with the valve seat 18.

Communication between the inlet port 14 and the outlet port 17 is initiated by applying an electrical signal to the solenoid 47 so that a control force is exerted against the spool 29 by the stem 48 in a downward or valve opening direction. Downward movement of the valve spool 29 initially restricts the opening of the meter-in orifice 42 and subsequently opens the meter-out orifice 38 between the control chamber 27 and the outlet port 17. This reduces the pressure level in the control chamber 27 so that the valve element 19 moves upwardly in a valve opening direction to initially unseat the conical surface 21 from the valve seat 18 and subsequently establishes communication between the inlet port 14 and the outlet port 17 through the flow modulating ports 16. The upward movement of the valve element 19 in the valve opening direction compresses the feedback spring 32 which exerts a feedback force against the valve spool 29 to counteract the control force exerted on the valve spool 29 by the solenoid 47 and will continue until the feedback force and the control force acting on the valve spool 29 are in equilibrium. At this point, the sizes of the meter-in orifice 42 and the meter-out orifice 38 are controllably modulated to maintain a pressure in the control chamber 27 such that the valve closing force exerted on the valve element 19 equals the valve opening forces. Thus, displacement of the valve element 19 is fed back by the feedback spring against the valve spool 29 so that displacement of the valve element is proportional to the level of the control force exerted on the pilot valve 29 by the solenoid 47. The combination of the feedback spring and the pilot valve spool compensate for flow forces or any other type of external disturbance force acting on the valve element 19. The fluid flow through the meter-in and meter-out orifices required to maintain the valve element in the open position is extremely small thereby permitting the use of a low force solenoid. A new position of the valve element 19 can be obtained by increasing or decreasing the strength of the electrical signal to the solenoid and, thus, the level of control force exerted on the valve spool 29. Complete removal of the electrical signal results in the valve element moving to the flow blocking position shown.

The relief valve 49 acts through the valve element 19 to relieve the pressure in the inlet port 14 when the fluid pressure therein exceeds a predetermined value as determined by the preload on the spring 52. More specifically, the pressurized fluid from the inlet port 14 is continuously communicated to the control chamber 54 to exert a force on the valve spool 51 in opposition to the spring 52. When the force exerted on the valve spool 51 by the pressurized fluid in the chamber 54 exceeds the force exerted on the valve spool 51 by the spring 52, the valve spool 51 moves downwardly against the bias of the spring 52. Downward movement of the valve spool 51 initially blocks communication between the passages 53 and 43 with the passage 53 subsequently being in communication with the passage 43 solely through the fixed size orifice 57. Further downward movement of the valve spool 51 results in the opening of the meter-out orifice 58 to establish series fluid flow through the fixed orifice 57 and the meter-out orifice 58. A pressure drop is established across the fixed size orifice 57 when the size of the meter-out orifice 58 exceeds the size of the fixed orifice 57 thereby reducing the fluid pressure in the control chamber 27. As previously described, reducing the fluid pressure in the control chamber 27 reduces the valve closing force exerted on the valve element 19 and eventually the valve opening force becomes greater than the valve closing force thereby causing the valve element 19 to move upwardly to communicate the inlet port 14 with the outlet port 17 to relieve the pressure in the inlet port 14. When the fluid pressure in the inlet port 14 decreases to a level below the predetermined level, the spring 52 will again urge the valve 51 to the position shown to re-establish communication between the inlet port 14 and the control chamber 27 to urge the valve element 19 to the fluid blocking position shown.

Operation of the second embodiment shown on FIG. 2 is essentially as described above with the differences being on how the fluid pressure in the control chamber 27 is controlled. More specifically, opening of the valve element 19 is initiated by directing an electrical signal to the solenoid 47 so that the solenoid exerts a predetermined control force against the spool 29 in a direction urging the valve spool toward the valve element 19. This results in opening of the meter-out orifice 38 to establish modulated communication between the control chamber 27 and the outlet port 17. With the meter-in orifice 61 and the meter-out orifice 38 now being in a series flow relationship, a pressure drop will be generated across the meter-in orifice 61 when the size of the meter-out orifice 38 is opened. This thereby reduces the fluid pressure in the control chamber 27 and once the fluid pressure is reduced sufficiently for the valve closing force on the valve element to become less than the valve opening force, the valve element 19 will move upwardly to establish communication between the inlet port 14 and outlet port 17. As previously described in regards to the first embodiment, the upward movement of the valve element 19 causes the feedback spring 32 to exert a force on the valve spool 29 in a valve closing direction in opposition to the control force exerted by the solenoid. Movement of the valve element 19 in the valve opening direction will stop once the force exerted by the feedback spring 32 equals the control force so that displacement of the valve element 19 is proportional to the control force.

In view of the foregoing, it is readily apparent that the structure of the present invention provides an improved force feedback popper valve which functions similarly to a servo valve wherein displacement of the popper valve is proportioned to a control force exerted on a pilot valve spool. This is accomplished by positioning a force feedback spring between the valve element and the pilot valve spool so that displacement of the valve element in the valve opening direction compresses the feedback spring causing it to exert a feedback force on the pilot valve spool in opposition to the central force such that movement of the valve element stops when the control force and the feedback force are in equilibrium. The present force feedback popper valve compensates for flow forces acting on the valve element.

Other aspects, objects and advantages of this invention can be obtained from a study of the drawings, the disclosure and the appended claims.

I claim:

1. A force feedback popper valve having an inlet port, an outlet port, a bore, a valve element slidably disposed in the bore between open and closed positions to control fluid flow between the inlet and outlet ports and having a first reaction surface and a second larger reaction surface, an actuation chamber defined in part by the first reaction surface and being in continuous communication with the inlet port, and a control chamber defined in part by the second reaction surface comprising:
    a first passage communicating with the inlet port;
    a second passage communicating with the outlet port;
    a pilot valve disposed between the control chamber and the first and second passages and including a valve spool defining a variable meter-in orifice disposed to communicate the first passage with the control chamber and a variable meter-out orifice disposed to communicate the control chamber with the second passage, the valve spool having a first position blocking fluid flow through the meter-out orifice and movable from the first position in a first direction to open the variable meter-out orifice;
    means for selectively exerting a variable control force urging the valve spool in the first direction;
    a force feedback spring positioned between the valve element and the valve spool to exert a feedback force against the pilot valve in proportion to the displacement of the valve element; and
    a relief valve disposed in the first passage and connected to the second passage to normally block the first passage from the second passage when the fluid pressure in the inlet port is below a predetermined value, the relief valve being movable to a pressure relieving position to reduce the fluid pressure in the control chamber when the fluid pressure in the inlet port exceeds the predetermined value.

2. The force feedback poppet valve of claim 1 wherein the relief valve includes a valve spool having a first position at which communication is established through the first passage and the second passage is blocked from the first passage.

3. The force feedback poppet valve of claim 2 wherein the valve spool of the relief valve has a second position establishing a fixed size orifice in the first passage and a variable orifice is established between the first and second passages.

4. The force feedback poppet valve of claim 3 including a spring resiliently urging the valve spool of the relief valve to the first position.

* * * * *